Aug. 11, 1931.  W. STELZER  1,817,952
PROPELLING DEVICE FOR AIRCRAFT AND THE LIKE
Filed Sept. 25, 1929
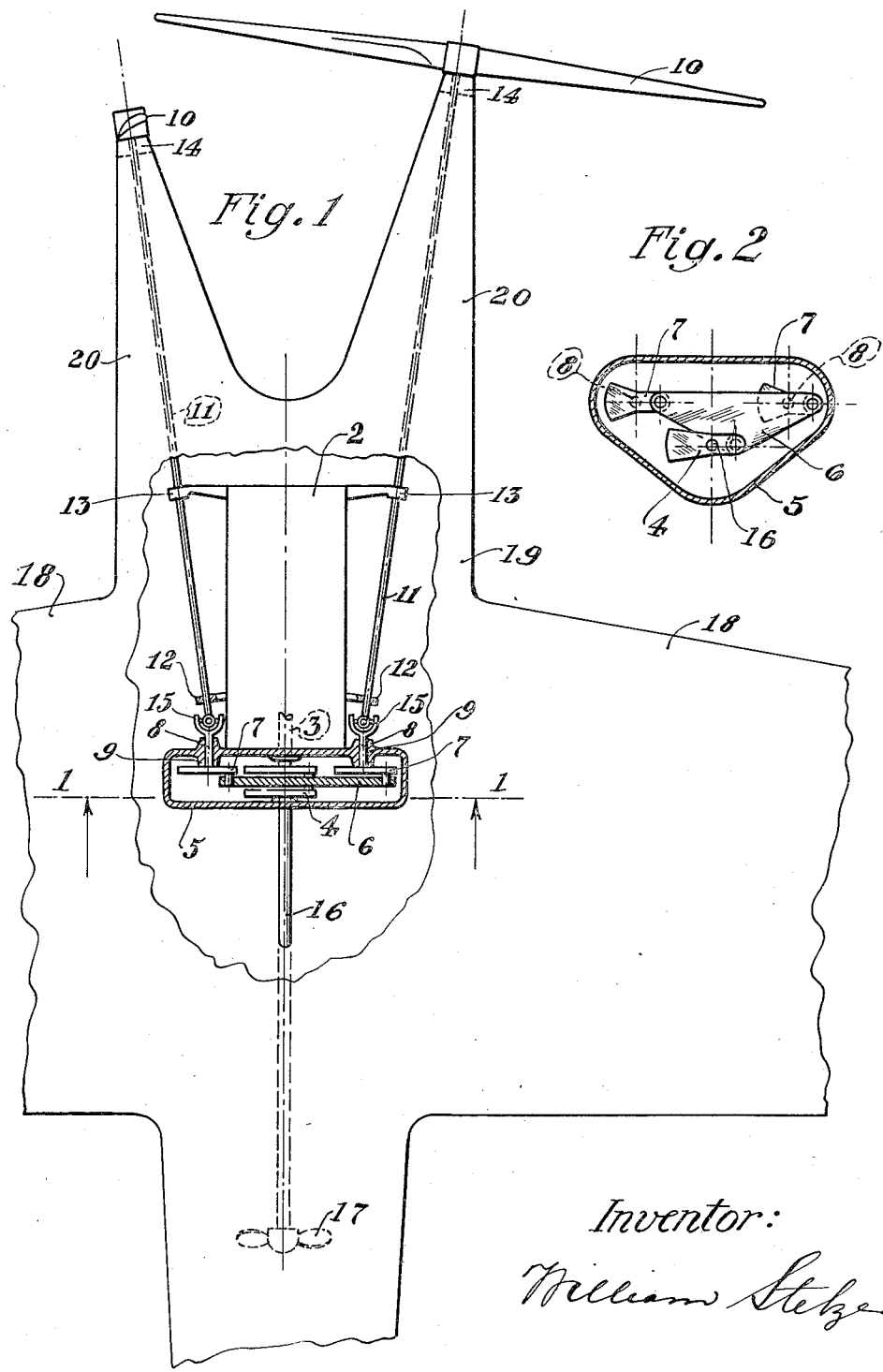
Inventor:
William Stelzer Patented Aug. 11, 1931

1,817,952

UNITED STATES PATENT OFFICE

WILLIAM STELZER, OF CHICAGO, ILLINOIS, ASSIGNOR TO AMERICAN PROPELLER COMPANY, OF BALTIMORE, MARYLAND, A CORPORATION OF MARYLAND

PROPELLING DEVICE FOR AIRCRAFT AND THE LIKE

Application filed September 25, 1929. Serial No. 394,987.

The invention relates to improvements in aircraft and the like and more particularly to a device for driving a plurality of propellers with a single power unit, where power is transmitted from said power unit to the propellers by means of cranks or eccentrics.

The object of the invention is to provide an efficient propelling device for aircraft or watercraft.

The present invention shows a further embodiment of the invention shown in my application for patent filed September 3, 1929, Serial Number 389,931 and is therefore related to that invention as far as the employment of a water propeller in conjunction with a hydroplane is concerned. However, the principal object of this invention is to provide effective means for actuating a plurality of propellers, where a single power unit is used. A further important object is the elimination of gears.

Another object is to increase the propeller disk area and to reduce the velocity of the blades. This object cannot be obtained with present methods unless a speed reducing mechanism is employed, or if the propellers are mounted in tandem. The latter arrangement does not afford an increase in the effective propeller disk area, because the quantity of air accelerated is not larger. I have therefore devised a propelling mechanism where the propellers are mounted parallel. Counter propeller action is made effective by placing the propellers close together. As each propeller takes up only a fraction of the total power output of the engine, and thereby may be of smaller diameter, the same result is obtained as with a reducing mechanism, which permits the use of a high speed engine without reducing the propellor efficiency.

The device shown is of simple and inexpensive construction and is therefore superior to a speed reducing mechanism.

A further object is to provide an improved starting device for aircraft as the thrust produced by the air propellers is augmented by the lift and thrust produced by the water propeller.

The invention also aims to provide propelling mechanism which permits a decrease in the height of the landing gear. This is attained by using a plurality of propellers of relatively small diameter, made possible and practical by the novel device.

Other objects may appear in the following detailed description, wherein:

Figure 1 is a sectional top plan view of the device embodied in a hydroplane using two air propellers and a water propeller, and Figure 2 is a view taken on lines 1—1 of Fig. 1.

For the sake of simplicity both views are shown diagrammatically and therefore do not disclose structural details in proper form or proportion.

The terms employed herein are used in the generic and descriptive sense, and therefore are not intended primarily as terms of limitation.

The power unit or engine 2 by means of its crank shaft 3 turns the drive crank 4 journaled in the housing 5 which is rigidly secured to the crankcase of the engine 2 and may consist of several parts to permit assemblage. This housing 5 merely serves as a support for the mechanism and as a container for the lubricating oil. It is therefore apparent that said housing may be part of the engine or crankcase or that the entire mechanism may be within the crankcase, depending on the type of engine used.

The plate or frame 6 adapted to receive the crank pin of said crank 4 and the crank pins of propeller cranks 7, 7 transmits power from said drive crank 4 to said propeller cranks 7, 7, whose journals 8, 8 are parallel to the crank shaft 3 and revolubly supported at 9, 9 to drive a pair of air propellers 10, 10 by means of propeller shafts 11, 11 supported in intermediate bearings 12, 12, 13, 13, and 14, 14. Universal joints 15, 15 are interposed between the journals 8, 8 and the propeller shafts 11, 11 to permit obliquity between the two propeller shafts. Thus the crank mechanism may be of very compact construction without limiting the size of the propellers 10, 10.

Figure 2 gives a better illustration of the arrangement of the cranks 7, 7 and the plate 6. The former are provided with counterweights to counterbalance the plate 6 which is built of light material or constructed as a rigid frame provided with bearings for the crank pins of the cranks 7, 7 and 4. The said bearings are preferably anti-friction bearings, however, ordinary bearings have been shown as the details of construction have no connection with the spirit and scope of the invention.

The journal of the drive crank 4 is extended and serves as a propeller shaft 16 axially aligned with the crankshaft or engine shaft 3, driving the water propeller 17 which is keyed to it. Therefore, the propeller shaft 16 may be considered as a continuation of the engine shaft 3.

The device is shown embodied in a hydroplane, where 18, 18 are the wings, 19 the hull or body structure and 20, 20 joists for supporting the air propellers 10, 10. Said joists are of unequal length to prevent interference between the propeller blades. It will be noticed from the drawings that the blades acting on the same area move in opposite directions and therefore provide the desirable counter propeller action.

While I have herein shown and described a single embodiment of the invention as applied to a specific type of aircraft, I wish to make it clearly understood that the invention can be carried out in ways different from that shown without departing from the spirit and scope of the invention. The primary idea is to provide a plurality of propellers, and it may readily be seen from the drawings that the principle may be applied in a device to actuate any number of propellers, provided the plate 6 is made large enough. It is merely necessary to support said plate 6 with at least three cranks to provide faultless operation. If only two cranks were used, there would be a dead point and the device would not be dependable any more.

A further modification might be to place the crank mechanism forward of the engine 2. If the device is embodied in a land plane, said water propeller 17 may be replaced by one or more air propellers, or it may be left off entirely.

It is also apparent that the same results may be obtained by using eccentrics instead of the cranks 7, 7 and 4.

Further embodiments, modifications, and variations may be resorted to within the scope and spirit of the invention as here claimed:

1. In a device for the propulsion of aircraft in combination, an engine having a drive shaft, a drive crank actuated by said drive shaft, a water propeller shaft axially aligned and connected to said drive shaft, means for rotatably supporting said water propeller shaft, a water propeller connected to said water propeller shaft, a pair of propeller cranks arranged parallel to said drive shaft, a frame adapted to receive the crank pins of said propeller cranks and said drive crank to transmit power from said drive crank to said propeller cranks, a pair of propeller shafts actuated by said propeller cranks, universal joints intermediate said propeller cranks and said propeller shafts, an air propeller mounted to each of said propeller shafts, and means for rotatably supporting said propeller shafts and the journals of said propeller cranks.

2. In a device for the propulsion of aircraft, a driving motor, a casing attached thereto, a shaft driven by said motor and extending through said casing, a water propeller carried by said shaft, a crank on said shaft within said casing, a plurality of shafts journaled in said casing, said shafts being parallel to said first-named shaft, cranks carried by all of said shafts and being disposed within said casing, a plate connecting said cranks, whereby rotation of said first-named shaft will effect rotation of said second-named shafts, propeller shafts, universal joints drivably connecting said propeller shafts and said shafts journaled in said casing, and a propeller carried by each of said propeller shafts.

In testimony whereof I affix my signature.

WILLIAM STELZER.